Figure 1:
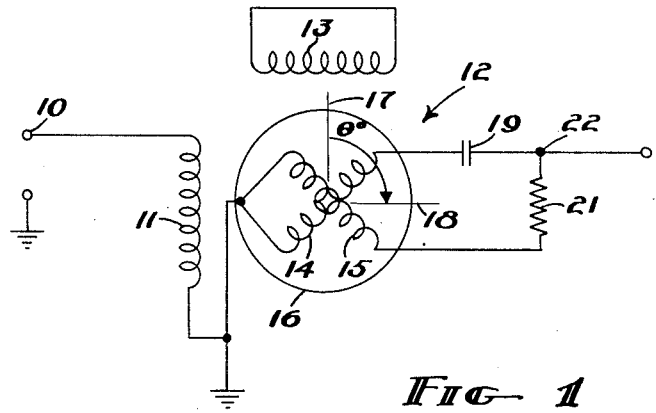

May 7, 1957   D. A. CARNEY   2,791,744
WIDE BAND PHASE SHIFTER
Filed April 5, 1955   2 Sheets-Sheet 1

INVENTOR.
DUANE A. CARNEY
BY *Morris Moody*
ATTORNEY

INVENTOR.
DUANE A. CARNEY

United States Patent Office 2,791,744
Patented May 7, 1957

2,791,744
WIDE BAND PHASE SHIFTER

Duane A. Carney, Cedar Rapids, Iowa, assignor to Collins Radio Company, Cedar Rapids, Iowa, a corporation of Iowa Application April 5, 1955, Serial No. 499,293

6 Claims. (Cl. 323—109)

This invention relates in general to phase shifting devices. The present invention is of a self-correcting system which will correct errors arising within the system due to a change in frequency of the signal being shifted in phase by the system.

The moving coil phase changer used in the invention is merely a transformer in which the secondary is a wound rotor carrying two secondary windings distributed in space quadrature. Since the rotor is continuously rotatable, the windings may be rotated with relation to the primary windings. The primary windings may be single or plural, and if plural are in space quadrature also. The result of this physical arrangement is to create two voltages on the secondary, the amplitude of which are related to the primary voltages as cosine and sine functions of the space angle through which the rotor is turned. Using this type of phase changer, also known in the art as a resolver, prior art devices have employed a resistance-capacitance network at the output of the resolver to add the two secondary voltages for a resultant phase shift from the input voltage of one of the primaries. This phase shift results from the mechanical rotation of the rotor and the effect of the resistance-capacitance network. A device of this type necessarily is dependent on frequency and for a different frequency the resistance-capacitance network would yield a different phase shift.

One object of this invention is to provide a phase shifting system which will readjust itself for errors arising from a change of the frequency of the transmitted signal.

Another object of this invention is to provide a frequency measuring system which is automatic in operation.

A further object of this invention is to provide a phase shifting system which is operable over an extended range of frequencies.

This system uses the moving coil type of phase shifter. It will function with either single or two winding input types of resolvers as well as high resolution types having two windings and accompanying feedback windings.

Under ideal conditions in a resolver the primary, stator windings set up a magnetic flux in the air gap between the stator and rotor which varies sinusoidally with rotation about the periphery of the rotor and at any point has a value proportional to the alternating voltage applied to the stator winding. The magnitude of the voltage induced in the rotor windings consequently will vary as the sine of the angle between the axis of one of the rotor windings and a reference stator winding and as the cosine of the angle for the other winding on the rotor in quadrature relation to said one rotor winding.

It is also possible to use "selsyn" types of moving coil devices pursuant to the invention. The circuit connections would be similar to those of the resolver type, taking into consideration the three-phase spatial relations of the "selsyn" compared to the two-phase spatial relations of the resolver.

One of the features of this system is that it uses a phase shifting system in the error circuit in a manner similar to the phase shifting system in the signal circuit so as to derive a phase error related to the frequency characteristics inside the system. By means of comparison networks this phase error is converted to a voltage which is used to control a servo system which acts to reduce the error. By using decade capacitances and resistances variable over a range of ten to one, for example, a servo system can be used which seeks a null within the range of the variable resistances and, not finding it, shifts the capacitances decade by decade until a balance within the range of the variable resistances is found. Thus, the system will maintain the phase shift as set by the control of the resolvers, regardless of variation of the signal frequency. Virtually the only limit to frequency would be in the capabilities of the resolvers, and in the range of the capacitors, where stray capacities would be a limit in one direction.

Another feature of this system is in the use of dials which indicate the status of the resistance-capacitance networks as they are being adjusted. Thus, a measure of frequency can be obtained since the change of the resistance-capacitive networks arises from a change in frequency from some balance point.

Figure 2:
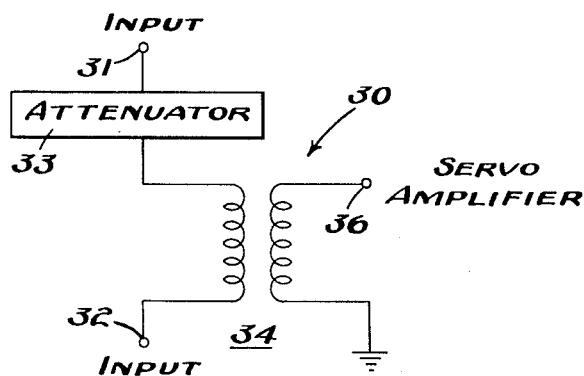
Figure 3:
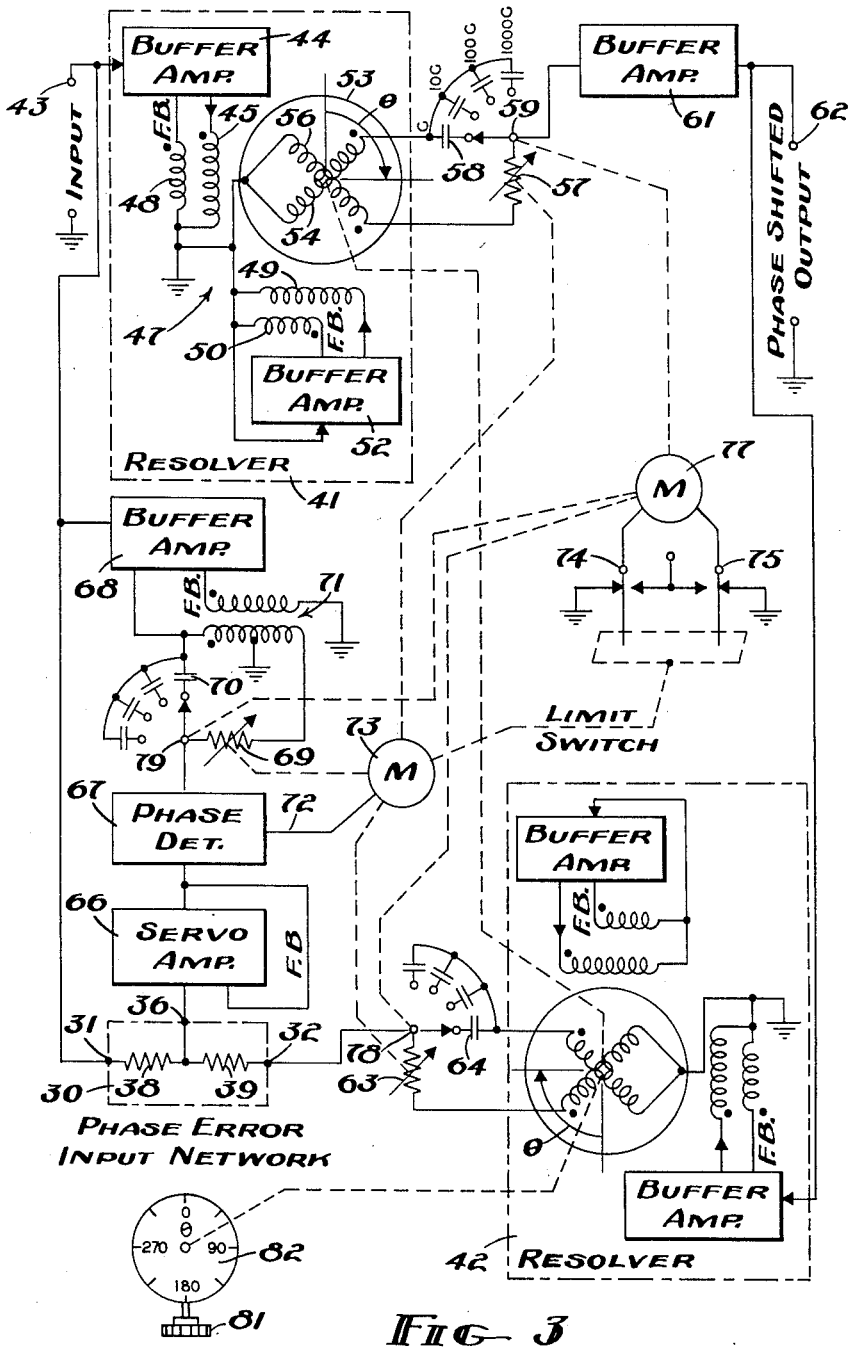

Further objects, features, and advantages of this invention will become apparent from the following description, claims, and drawings, wherein:

Figure 1 shows one type of resolver phase shift system which may be incorporated in the invention, and which is illustrative of the prior art;

Figure 2 shows an alternative phase error input network. This network yields an alternating output voltage which phase is related to the difference of the phases of the two input voltages. The network may be substituted for the summation type phase error input network shown in Figure 3;

Figure 3 shows a preferred form of the new phase shifting system using a type of resolver more advanced than the type shown in Figure 1 for purposes of explanation.

Figure 1 shows a prior art type of phase shifter using a resolver of the type made by the Reeves Instrument Corporation of New York. In prior art phase shifting systems a voltage brought to the input terminals 10 is applied to one of the stationary primary windings 11 of a resolver generally referred to as 12 comprised of two stator windings 11 and 13 in space quadrature and inductively coupled to two windings 14 and 15, also in space quadrature, which are mounted on a rotor 16 which may be continuously rotated.

In Figure 1 a reference line 17 and a rotation of $\theta$ degrees of the rotor to a position 18 is shown. The unused primary winding 13 is generally short-circuited, although the winding may be left open-circuited with some change in accuracy in operation or omitted entirely. One end of each of windings 14 and 15 is grounded, and the other ends brought out to a resistance-capacitance network. This network consists of capacitor 19 and resistor 21 in series, closing the external circuit of the secondary of the moving coil transformer. The midpoint of the resistance-capacitance circuit comprises the output 22 of this phase shifting system.

The phase shift at terminal 22 of the signal applied to terminal 10 is a function of the mechanical rotation $\theta$ of the resolver rotor and of the phase shift caused by the well known characteristics of a series resistance-capacitance network. It is obvious that as the frequency of the input signal varies the resistance-capacitance network phase shift will vary the output phase angle since the electrical characteristics of the resolver will not introduce any phase errors when operated within its pass band. However, at a single frequency where the reactance of the condenser equals the impedance of the resistor, a change of the mechanical rotation of the resolver will cause a change in the phase shift transferred by the system from its input to its output terminals. Of course, interchange of the resistance and capacitance will cause the phase shift transferred to be in the opposite sense.

Figure 2 shows an alternative phase error input network 30 which is usable under a condition when the two phase shifter devices in Figure 3 are coupled mechanically so that the rotors move in the same direction. The network consists of two inputs 31 and 32 with an optional attenuator 33 which acts to balance the amplitude of the two voltages applied to the input terminals. The currents from the two voltage sources are superimposed in the primary of transformer 34. The phase angle of the voltage induced in the secondary of the transformer is related to the difference of the phase angles applied to the inputs of the network 30. This type input network requires the two input voltages to be in phase for the servo amplifier and motor system to approach a null. The output 36 of this network is fed directly to the servo amplifier, as is the output of the network shown in Figure 3.

Figure 3, illustrating the preferred form of the phase shifting system, shows the signal resolver 41 and an error developing resolver 42 wherein an error signal related to the error in phase angle created in the signal channel is generated. In the signal resolver will be found elements which are identical to the error resolver and which are described with relation to the signal resolver only.

The signal input to the system 43 is connected to an amplifier 44 which applies the signal to a primary winding 45 of a resolver 47. The gain of this amplifier may be approximately $\sqrt{2}$ so that the outputs of the secondaries 54, 56 are approximately equal to the input amplitude. With the system adjusted for a no phase error condition, the output level of the signal will be the same as the input. A feedback winding 48, which generates a voltage proportional to the signal voltage applied to the primary of the resolver, is connected to a feedback input of the buffer amplifier 44 to reduce variations due to frequency and to gain other benefits well known in the electronic art. The resolver 47 has a second set of primary windings on the stator 49 and 50 which are, respectively, signal and feedback windings, and which are connected to buffer amplifier 52. The input of amplifier 52 is shorted. Stator winding 49 is thus operated in a short-circuited condition similar to that of winding 13 of Figure 1.

Rotor 53 of the resolver carries on it two windings 54 and 56 in space quadrature coupled inductively to the previously mentioned stator windings. The outputs of the moving coils 54 and 56 are connected to a series resistance-capacitance circuit. One end of each of the windings on the rotor is connected to ground whereby the voltages at the other ends are related as the cosine and sine of the mechanical angle $\theta$ through which the rotor may be rotated in adjusting the resolver to a desired angle of phase shift. The rotor is ordinarily continuously variable.

The resistance-capacitance network consists of a variable resistance 57 which may be varied over a decade of values, that is to say, varied over a range of ten to one. The capacitance 58 in this network is a fixed value, but by means of switch 59 the value of capacitance may be selected from a group of capacitances related in decade manner. Each position of switch 59 will change in sequence the capacitance in the circuit by a factor of ten.

The junction of the condenser 58 and resistor 57 is substantially the output of the signal or transfer path of the phase shifting system, since the optional buffer amplifier 61 is shown between switch 59 and the output terminal of the system 62 to provide isolation between the resistance-capacitance network and the output, and to give a lower output impedance. The output of this amplifier may be adjusted to give unity over-all gain, or any gain desired.

A voltage from the output of the signal path is applied to the resolver 42. Resolver 42 has identical characteristics to resolver 41, and has a network having resistor 63 and capacitor 64 similar to the resistance-capacitance network 57, 58 in the signal path. The two resistance-capacitance networks are held as identical as possible. The output of the error loop resistance-capacitance network is connected to input 32 of the phase error input network. The input voltage to the system at point 43 is applied to the other input 31 of the phase error input network 30. Network 30 in Figure 3 is an additive type comprising resistors 38 and 39 which are proportioned such that the amplitude of the voltages from the two inputs are the same at the output point 36. The phase of the output voltage 36 is related to the phase error developed through the error path 42, etc., plus the signal path 41, etc.

A servo amplifier 66, with feedback to provide better characteristics, as is well known in the art, is connected to one of two inputs of phase detector 67. The other input of phase detector 67 is connected to the system input 43 through a buffer amplifier 68, a tapped secondary transformer 71, and a network of resistance 69 and capacitance 70 which is similar to the resistance-capacitance network 57, 58 in the signal path. This additional path 68, 71, 70, and 69 develops the phase shift characteristic of the resistance-capacitance networks without the characteristic of the resolver, and establishes a phase reference for the phase detector.

Phase detector 67 yields an output 72 which drives servomotor 73 to vary the resistances of the resistance-capacitance phase shifting networks and so seek a null point in the output voltage 72. Servomotor 73 varies resistors 57, 63, and 69 simultaneously and in the same direction. At the limits of resistance variation motor 73 operates one of the limit switches 74, 75 of the capacitor decade switch motor 77. Whenever the resistance variation comes to an extreme, one of the limit switches is operated by motor 73 to actuate motor 77 so as to change the decade capacitors simultaneously by switches 59, 78, and 79 in a direction which requires the resistance to be changed in a direction away from that extreme which operated the limit switch.

In order to control the phase shift of a voltage applied to terminal 43, appearing at 62, rotor 53 and the corresponding rotor of the error signal resolver are simultaneously adjusted mechanically to the desired phase shift by knob 81. With the resistance-capacitance networks similarly connected, the rotors of the resolvers should be connected to be rotated in opposite directions. A dial 82 may be used to indicate the phase shift introduced by the system between the terminals of the signal path as set by the phase shifter set knob. In operating to maintain this dial set phase shift the system operates in the following manner:

A voltage applied to terminal 43 is applied to primary winding 45 by the buffer amplifier 44. Voltages are induced in windings 54 and 56, proportionally related to the voltage applied to winding 45 as sine and cosine functions of the angle $\theta$ at which the system is set. These voltages are applied to the phase shift network 58 and 57 and carried from the output point 59 to the output terminal 62. When the frequency changes from a frequency at which the reactance of the capacitor equals the resistance, the output voltage will vary from the indicated angle by an error angle $\phi$. This voltage is fed to the error resolver 42 and the resistance-capacitance network 63, 64 which introduces a like error such that the error now is 2 $\phi$. This voltage is applied to terminal 32 of the phase error input network.

The input voltage to the system is applied to terminal 31 and the phase of the resultant voltage at terminal 36 is related to the input voltage by (90°−φ). Of course, the amplitude of the voltage at terminal 36 will go through a null when φ goes through a null, as a result of the trigonometric addition of two sine functions. For this reason the system accuracy will be least at zero and 180° values of θ, the system transfer phase shift; the frequency indication will be least accurate here also, since the accuracy of the servo in setting resistance and capacity depends on a dependable error signal with which to correct the system.

A third channel 68 and phase shifter 69, 70 from the input 43 shifts the phase a similar amount (90°−φ) to serve as a reference voltage for the phase detector 67. The output voltage 72 of the phase detector 67 is at a null when the error angle φ is zero. Servomotor 73 operates to change the resistances 57, 63, and 69 in a direction to reduce this phase angle error.

In the event that the resistance approaches an extreme in value one of the limit switches 74 and 75 is actuated by motor 73 to operate motor 77. Motor 77 is controlled in direction by the limit switches to change the capacitances by decades in a direction to reduce voltage 72 to a null point, by operating switches 59, 78, and 79 in the proper direction. Motors 73 and 77 will thus hunt until a null point is found which will mean that the system has been adjusted to eliminate the error φ which has arisen in the signal path. The phase shift between input 43 and output 63 will then be θ, set by knob 81.

The phase detector 67 and motor 73 may be replaced with a two-phase induction motor. One phase of the two-phase induction motor is excited by the input voltage at 43 and the other phase by the output of the servo amplifier 66. One disadvantage of this is that the bandwidth of frequencies which can be handled by the error control system is limited to those to which the two-phase motor will respond uniformly. A hysteresis motor made by the Collins Radio Company of Cedar Rapids, Iowa, will respond to a bandwidth from very low frequency to approximately 5,000 cycles. The over-all frequency response of the system as disclosed in the preferred form, using the commercially available Reeves type 602H resolver, is approximately $\frac{1}{10}$ cycle per second to 100,000 cycles per second. The accuracy of the system under this circumstance may be as good as three minutes of arc.

To use the system to indicate frequency, dials are added to the shaft of servomotor 73, to indicate frequency within a decade, and to the shaft of the decade switch motor 77, to indicate which decade of frequency. This is the result of the capacitive reactance varying linearly with frequency and the resistance varying similarly to balance a change of reactance due to a change of frequency.

A system has been disclosed which is capable of maintaining a desired phase shift of a signal over a wide band of frequencies and independently of errors which may arise within the system.

Although this invention has been described specifically with resolvers, any type of moving coil transformers may be used, and it is obvious to those skilled in the art that other types of phase shifters in place of the resistance-capacitance type shown may be substituted without departing from the spirit of the invention, which is not to be limited to the particular embodiment disclosed, but only by the scope of the appended claims and the state of the prior art.

I claim:

1. A signal phase shifting system comprising, a system input, a first adjustable phase shifting means having two adjustment inputs, and a system output, connected in that order in the signal path, phase error detecting means, a second adjustable phase shifting means having two adjustment inputs, an input and an output, said input being connected to said system output, said output being connected to said phase error detecting means, mechanical means to couple one of said adjustment inputs of said first and second phase shifting means to adjust the phase shift of said signal path, and means responsive to said detecting means to adjust the other of said adjustment inputs of said first and second phase shifting means to reduce errors arising in said signal path.

2. A phase shifting system comprising a signal transfer resolver with an electrical input, a mechanical input in the form of the rotor position, and electrical output terminals, a first adjustable phase shifting means connected across said output terminals, the output of said first phase shifting means being the signal output of said system, a second resolver, similar to said signal transfer resolver, with its electrical input connected to said output and having a rotor and electrical output terminals, a second adjustable phase shifting means connected across said second resolver output terminals, phase sensing means yielding a voltage passing through a null proportional to a difference in phase angle between said second phase shifting means output and the signal input of said system, means to vary each of said variable phase shifting means together to reduce the voltage of said phase sensing means to a null, and control means mechanically connecting together the rotors of said resolvers for control of the phase shift created by the system in said signal transfer path.

3. A phase shifting system comprising a first moving coil phase changer in a signal path and having an electrical input connected to the system input and an output terminal, a first adjustable phase shifting network connected to said output terminal, the output of said network connected to the output of said signal path, a circuit including a second moving coil phase changer having its electrical input connected with said signal path output and its output terminal connected to a second adjustable phase shifting network, a phase detector having one input and an other input and having an output varying in amplitude through a null and proportional to the phase difference of voltages applied to said inputs, network means to derive a phase error between the input of said system and the output of said second phase shifting network, said network means output being connected to said one input of said phase detector, a third phase shifting network which input is connected to the input of said system and which output is connected to the said other input of said phase detector, means to vary each of said phase shifting networks together to reduce the phase detector output to a null, and means mechanically connecting together the moving coils of said phase changers, which means is adjustable for control of the phase shift created by said system.

4. A phase shifting system comprising a signal transfer resolver with an electrical input, a mechanical input in the form of the rotor position, electrical output terminals, a first adjustable phase shifting network connected across said output terminals, the output point of said first network being the signal output of said system, a second resolver similar to said signal transfer resolver connected to said output, having electrical output terminals and a rotor, a second adjustable phase shifting network connected across said second resolver output terminals, a phase detector, a phase error input network with two inputs and an output corresponding to the phase error within the system, one of said inputs being connected to the input of said signal resolver, the other of said two inputs being connected to the output of said second phase shifting network, and the output connected to an input of said phase detector, a third phase shifting network which input is connected to the input of said signal resolver, and which output is connected to an other input of said phase detector, means to vary each of said phase shifting networks together to reduce the phase detector output to a null, and control means mechanically connecting the rotors of said resolvers for control of the phase shift created by the system.

5. A signal phase shifting system comprising a first resolver having first and second stator windings in quadrature, first and second feedback windings each inductively coupled to its related stator winding, a rotor carrying a pair of windings in space quadrature, one end of each rotor winding being grounded and the other ends comprising the electrical output of said resolver, a signal buffer amplifier with its inputs connected to the input terminal of said system and to the first feedback winding, the output of said signal buffer amplifier being connected to the first stator winding, a second buffer amplifier, which signal input is shorted, connected to said second feedback winding, and which output is connected to said second stator winding, phase shifting means comprising a capacitance and resistance in series connected across said resolver output terminals, the value of said condensers being adjustable in decade manner, the resistor being variable over a range of ten to one, a buffer amplifier which input is connected to the junction of said condenser and resistor, which buffer amplifier output is the output of said system, a second resolver identical to said first resolver, which input is connected to the output of said system, a second phase shifting means identical to said first phase shifting means connected across said resolver, network means to compare the voltage at the junction of said resistance and capacitance of said second phase shift means with the input voltage of said system, an amplifier connected to the output of said network means, which output is connected to phase detecting means, a phase angle reference source for said detecting means comprising a buffer amplifier connected between the input of said system and a third phase shifting means identical to said first and second phase shifting means, a motor driven by said phase detecting means connected mechanically to the resistors of each of said three phase shifting means to vary the resistances together in a direction to reach a null, limit switches at each end of the resistance values which operate a second motor to change each of said capacitors together in a direction to reach said null, means coupling mechanically the rotors of said resolvers so as to set the amount of phase shift which said system will introduce in the signal transferred between input and output terminals.

6. A signal phase-shifting system comprising input and output terminals, a signal path coupling said output to said input terminals including a first moving coil phase changer and a first adjustable phase shifting means; an error detecting path including a second moving coil phase changer, a second adjustable phase shifting means, and phase error sensing means, said error path being connected between said output and input terminals; first means mechanically coupled to said first and second phase changers, and second means mechanically coupled to said first and second phase shifting means, means connecting said first and second means to said sensing means so that said first and second means reduce error sensed by said phase error sensing means.

No references cited.